United States Patent [19]

Auderset

[11] Patent Number: 5,787,589
[45] Date of Patent: Aug. 4, 1998

[54] CUTTING SHEARS PARTICULARLY SECATEURS

[75] Inventor: Régis Auderset, Les Geneveys s/Coffrane, Switzerland

[73] Assignee: Felco SA, Coffrane, Switzerland

[21] Appl. No.: 886,045

[22] Filed: Jul. 3, 1997

Related U.S. Application Data

[63] Continuation of Ser. No. 529,458, Sep. 18, 1995, abandoned.

[30] Foreign Application Priority Data

Sep. 27, 1994 [EP] European Pat. Off. ............. 94810563

[51] Int. Cl.⁶ .................................................. A01G 3/025
[52] U.S. Cl. ........................................ 30/261; 30/271
[58] Field of Search ..................... 30/261, 271, 254, 30/186; 81/177.1, 177.2, 427.5, 427; D8/52

[56] References Cited

U.S. PATENT DOCUMENTS

| | | | |
|---|---|---|---|
| 818,552 | 4/1906 | Petty | 30/261 |
| 1,453,603 | 5/1923 | Redman | 30/261 |
| 1,716,180 | 6/1929 | Marler | 30/186 |
| 2,295,385 | 9/1942 | Connors | 30/186 |
| 2,310,959 | 2/1943 | James | 30/186 |
| 2,348,903 | 5/1944 | Hart | 30/271 |
| 2,650,423 | 9/1953 | Phillips | 30/271 |
| 3,416,226 | 12/1968 | Pfaffenbach | 30/271 |
| 3,575,070 | 4/1971 | Nichols | 30/261 |
| 3,861,038 | 1/1975 | Charles et al. | 30/261 |
| 4,197,605 | 4/1980 | King | 7/105 |
| 4,635,363 | 1/1987 | Chapin | 30/257 |
| 4,964,216 | 10/1990 | Gosselin | 30/254 |
| 5,033,195 | 7/1991 | Appelkvist et al. | 30/254 |
| 5,046,381 | 9/1991 | Mueller | 30/298 |
| 5,058,277 | 10/1991 | Kishimoto | 30/261 |
| 5,301,431 | 4/1994 | Cera | 30/254 |

FOREIGN PATENT DOCUMENTS

| | | | |
|---|---|---|---|
| 352 982 | 1/1990 | European Pat. Off. | |
| 13866 | 9/1911 | United Kingdom | 30/271 |

*Primary Examiner*—Hwei-Siu Payer
*Attorney, Agent, or Firm*—Oliff & Berridge, PLC

[57] ABSTRACT

Cutting shears or pruning shears have one handle longer than the other handle. The tool can be used with two hands when cutting a cut-resistant object while maintaining the handiness and lightness of pruning shears for one hand.

13 Claims, 2 Drawing Sheets

CUTTING SHEARS PARTICULARLY SECATEURS

This is a Continuation of application Ser. No. 08/529,458 filed Sep. 18, 1995 now abandoned.

BACKGROUND OF THE INVENTION

The present invention relates to cutting shears comprising in particular a first handle having a cutting blade and a second handle having a counter-blade or a second cutting blade, the two handles being connected by a pin in order to allow cutting with a scissors effect; the invention concerns as well and more specifically secateurs or pruning shears.

Understood here as shears with a scissors effect are shears composed of two handles terminating in either a blade or a counter-blade and having a pivot pin permitting the blade to be brought together with the counter-blade (or second blade) or moved away therefrom by applying pressure upon the handles.

Two types of secateurs are known in particular, a first type called "secateurs for one hand", which can be used with a single hand and are consequently suitable for cutting branches of a limited diameter and cutting resistance. Secateurs equipped with a means of increasing the force, generally a means of reducing the cutting movement, and which can be used with one hand can be classified as the same type. The latter secateurs are generally of relatively intricate design and are complicated to use. They are also relatively heavy. Another type of secateurs is the "secateurs for two hands", equipped with two relatively long handles and able to sever more cut-resistant branches. Owing to their bulk and weight, these latter secateurs are generally used only in very special cases. A particular drawback of secateurs for two hands is that because of their lack of manageability, they cannot be guided with much precision. A user who has to prune a hedge or a tree having thin as well as thick branches will prefer to use a pair of secateurs for one hand, which are clearly lighter and more manageable than the others, and then resort to a saw or secateurs for two hands only when he does not succeed in severing a more cut-resistant branch.

The user thus generally uses two separate tools, which can be a major inconvenience when he is installed at the top of a tree. This also results in higher costs for acquiring tools.

The problems mentioned above concerning secateurs also clearly apply to other cutting tools with a scissors effect, notably cutting nippers or shears for sheet metal, or wire and cables of metal or other material.

A cutting tool for two hands is disclosed in U.S. Pat. No. 4,964,216. It is mentioned in this patent that if necessary the two handles can be elongated by telescopic means. Even if FIG. 1 of the patent shows only one of the two handles elongated, it is understood from the specification that, when using the device, the two handles are both in either short or lengthened position. From the design, it is also evident that these nippers are not intended to be used with one hand.

U.S. Pat. No. 4,197,605 shows cutting nippers whose one handle is longer than the other. In this case, the extra length is only intended to support a supplemental tool and there is no mention anywhere in the document that this extra length could be used in the object of the invention.

U.S. Pat. Nos. 4,635,363 and 5,046,381 show cutting nippers whose handles of differing lengths are ergonomically designed to fit the user's hand comfortably.

SUMMARY OF THE INVENTION

The object of the invention is thus to propose cutting shears, and more particularly secateurs, combining the advantages of the two aforementioned customary tools without the drawbacks, that can be used in a particular way.

The object is achieved with cutting shears comprising in particular a first handle having a cutting blade and a second handle having a counter-blade or a second cutting blade, the two handles being connected by a pin in order to permit cutting with scissors effect, wherein one of the two handles is longer than the other handle, the extra length of the longer handle being such that the user can easily press with the palm of the second hand on the length available beyond that already used by the fingers of the first hand.

BRIEF DESCRIPTION OF THE DRAWINGS

The invention is described below and is to be considered with reference to the accompanying drawing containing the figures where.

DETAILED DESCRIPTION OF THE PREFERRED EMBODIMENTS

Figure 1:
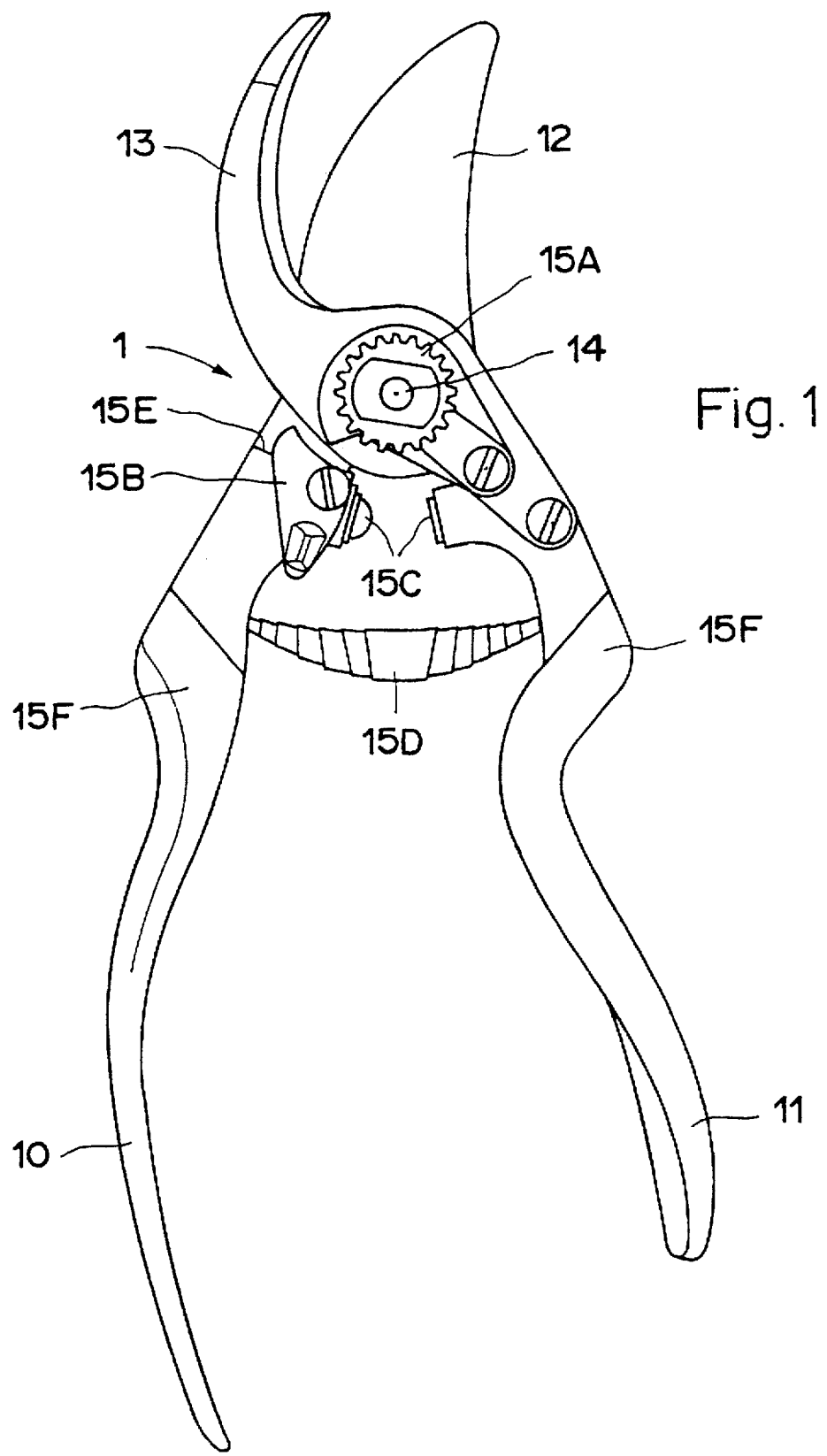
FIG. 1 shows a preferred embodiment of secateurs according to the invention.

In FIG. 1, the secateurs 1 according to the invention comprise, as do those already known, two handles 10 and 11, handle 10 having at one end a cutting blade 12 while handle 11 has a counter-blade 13. The two handles 10 and 11 are connected about a pivot 14 pin so as to bring blade 12 closer to counter-blade 13, by scissors effect, when the two handles 10 and 11 are brought together. Auxiliary means, generally known in the art, such as a device to regulate the force of the pivoting friction 15A, a device for locking in a closed position 15B, limit stops in closed position 15C, compression springs 15D, or limit stops in open positon 15E, protection 15F for the handles 10 and 11, can also be provided for the secateurs according to the invention.

Figure 2:
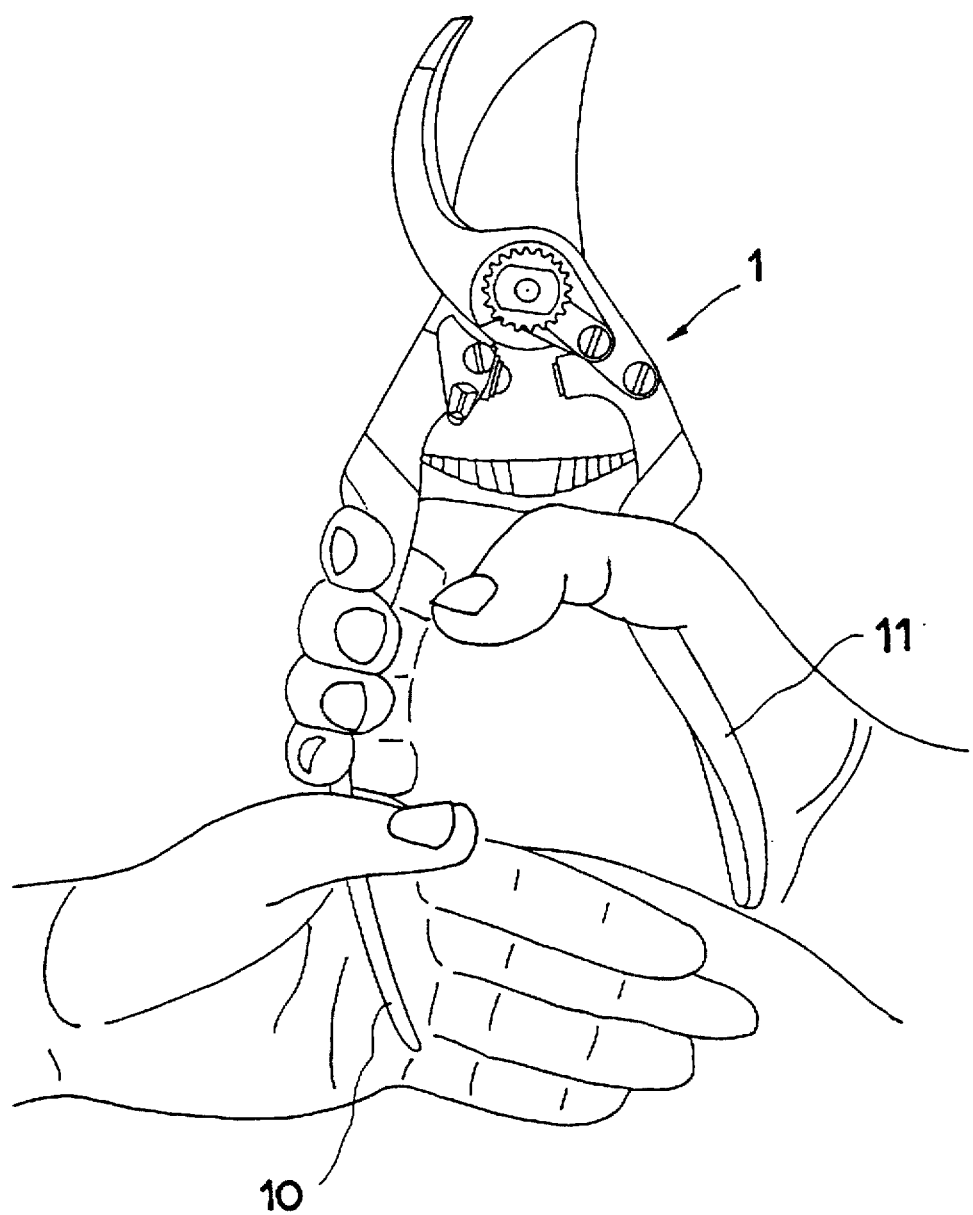
FIG. 2 shows a way of using the said secateurs.

The invention lies in the fact of providing that one of the handles, preferably handle 10 holding blade 12, is longer than the other handle 11, and, as can be seen in FIG. 2, the extra length of handle 10 allows the user to place the palm of his second hand there, under and in opposition to his first hand, so as to increase the force exerted for cutting. As can be seen in the figures, the extra length of handle 10 is not excessive and thus does not hinder the user when using just one hand. The length of the longer handle (10) is preferably less than 20 cm. Thus the secateurs remain very easy to handle and can be used as secateurs for one hand, the user being easily able to use his second hand to help in cutting a very resistant branch. Using just a single tool, the user is thus able to deal with any situation.

As indicated in the foregoing, the invention described above applying to secateurs can also apply to all types of cutting tools with a scissors effect, for example cutting shears for metal objects or objects made of other materials, for example sheet metal, wire or cables, etc. Variant embodiments of the secateurs or the shears can be envisaged, in particular the second handle can bear a cutting blade instead of a counter-blade, the condition being that one of the handles must be longer than the other in a way that the user can aid the cutting movement using his second hand.

What is claimed is:

1. Cutting shears, comprising:
   a first handle having a first portion and a second portion, the second portion of the first handle having a first fixed length;
   a second handle having a first portion and a second portion, the second portion of the second handle having a second fixed length;

a first cutting blade attached to the first portion of one of the first and second handles and a second blade attached to the first portion of the other of the first and second handles, the second blade being one of a cutting blade and a counter blade;

a pin for pivotally connecting the first and second handles for cutting by scissors effect by placing a palm of a first hand of a user on the second portion of the second handle and fingers of the first hand on the second portion of the first handle in selective combination with a palm of a second hand of the user on the second portion of the first handle;

a compression spring located between the first and second handles;

means for regulating a force of pivoting friction at the pin connecting the first and second handles;

means for locking the shears in a closed position;

first stop means for limiting movement of the first and second handles in a closing direction;

second stop means for limiting movement of the first and second handles in an opening direction;

means for protecting the first and second handles; and wherein the first fixed length is longer than the second fixed length by an extra length, the extra length being sized to allow placement of the fingers of the first hand and the palm of the second hand on the second portion of the first handle without overlapping the fingers of the first hand and the palm of the second hand, and the second portions of the first and second handles are curved toward each other such that at least one of said handles is concave toward the other of said handles and the extra length has a concave curvature toward said other handle.

2. Cutting shears according to claim 1, wherein the first fixed length is less than 20 cm.

3. Cutting shears according to claim 1, wherein the shears are pruning shears.

4. Cutting shears, comprising:

a first handle having a first portion and a second portion, the second portion of the first handle having a first fixed length;

a second handle having a first portion and a second portion, the second portion of the second handle having a second fixed length;

a first cutting blade attached to the first portion of one of the first and second handles and a second blade attached to the first portion of the other of the first and second handles, the second blade being one of a cutting blade and a counter blade; and a pin for pivotally connecting the first and second handles for cutting by scissors effect by placing a palm of a first hand of a user on the second portion of the second handle and fingers of the first hand on the second portion of the first handle in selective combination with a palm of a second hand of the user on the second portion of the first handle, wherein the first fixed length is longer than the second fixed length by an extra length, the extra length being sized to allow placement of the fingers of the first hand and the palm of the second hand on the second portion of the first handle without overlapping the fingers of the first hand and the palm of the second hand, and the second potions of the first and second handles are curved toward each other such that at least one of said handles is concave toward the other of said handles and the extra length has a concave curvature toward said other handle.

5. Cutting shears according to claim 4, wherein the first fixed length is less than 20 cm.

6. Cutting shears according to claim 4, wherein the nippers are pruning shears.

7. Cutting shears according to claim 4, further comprising a compression spring located between the first and second handles.

8. Cutting shears according to claim 4, further comprising means for regulating a force of pivoting friction at the pin connecting the first and second handles.

9. Cutting shears according to claim 4, further comprising means for locking the nippers in a closed position.

10. Cutting shears according to claim 4, further comprising stop means for limiting movement of the first and second handles in a closing direction.

11. Cutting shears according to claim 4, further comprising stop means for limiting movement of the first and second handles in an opening direction.

12. Cutting shears according to claim 4, further comprising means for protecting the first and second handles.

13. A method of using cutting shears, the cutting shears having a first handle having a cutting blade and a second handle having a counter-blade or a second cutting blade, the two handles being connected by a pin in order to allow cutting by scissors effect, one of the handles being longer than the other handle and the extra length of the longer handle being sufficient to accept a palm of a second hand of a user, the method comprising the step of using fingers and palms of first and second hands to press with the palm of the second hand on the extra length available beyond that already used by the fingers of the first hand.

* * * * *